(12) United States Patent
Arad et al.

(10) Patent No.: US 9,397,960 B2
(45) Date of Patent: Jul. 19, 2016

(54) PACKET STEERING

(75) Inventors: Nir Haim Arad, Nesher (IL); Noam Bloch, Bat Shlomo (IL); Ariel Shahar, Jerusalem (IL); Hillel Chapman, Ein HaEmek (IL); Amir Wated, Jatt Hamesholash (IL)

(73) Assignee: MELLANOX TECHNOLOGIES LTD., Yokneam (IL)

( * ) Notice: Subject to any disclaimer, the term of this patent is extended or adjusted under 35 U.S.C. 154(b) by 712 days.

(21) Appl. No.: 13/291,143

(22) Filed: Nov. 8, 2011

(65) Prior Publication Data

US 2013/0114599 A1 May 9, 2013

(51) Int. Cl.
*H04L 12/931* (2013.01)
*H04L 12/54* (2013.01)
*H04L 12/721* (2013.01)

(52) U.S. Cl.
CPC ............ *H04L 49/358* (2013.01); *H04L 49/355* (2013.01); *H04L 49/70* (2013.01); *H04L 12/569* (2013.01); *H04L 45/38* (2013.01)

(58) Field of Classification Search
CPC ..... H04L 49/30; H04L 47/2441; H04L 47/32; H04L 45/7453; H04L 47/10; H04L 49/351
USPC .......... 370/230, 235, 238, 392; 709/224, 225, 709/238, 240
See application file for complete search history.

(56) References Cited

U.S. PATENT DOCUMENTS

| | | | |
|---|---|---|---|
| 6,148,082 A * | 11/2000 | Slattery et al. ................ | 380/212 |
| 6,335,930 B1 * | 1/2002 | Lee ............................... | 370/387 |
| 6,532,211 B1 | 3/2003 | Rathonyi et al. | |
| 6,775,268 B1 | 8/2004 | Wang et al. | |
| 6,804,532 B1 | 10/2004 | Moon et al. | |
| 7,159,111 B1 | 1/2007 | Ganapathy | |
| 7,286,535 B2 | 10/2007 | Ishikawa et al. | |
| 7,675,876 B2 | 3/2010 | Foster et al. | |
| 7,746,854 B2 | 6/2010 | Ambe et al. | |
| 7,937,499 B1 | 5/2011 | Tripathi | |
| 8,341,724 B1 | 12/2012 | Burns et al. | |
| 8,804,747 B2 * | 8/2014 | Galles ..................... | H04L 47/10 370/399 |
| 2003/0065812 A1 * | 4/2003 | Beier et al. ..................... | 709/236 |
| 2003/0065856 A1 | 4/2003 | Kagan et al. | |
| 2004/0267881 A1 | 12/2004 | Yao et al. | |
| 2005/0071473 A1 * | 3/2005 | Rosenstock et al. .......... | 709/226 |
| 2005/0108518 A1 * | 5/2005 | Pandya ............... | H04L 63/0485 713/151 |
| 2006/0227788 A1 * | 10/2006 | Eldar et al. .................. | 370/395.4 |
| 2006/0280181 A1 | 12/2006 | Brailas et al. | |
| 2007/0005742 A1 | 1/2007 | Eldar et al. | |

(Continued)

OTHER PUBLICATIONS

U.S. Appl. No. 12/910,900 Office Action dated Apr. 9, 2013.

(Continued)

*Primary Examiner* — Alpus H Hsu
*Assistant Examiner* — Dharmesh Patel
(74) *Attorney, Agent, or Firm* — D.Kligler IP Services Ltd.

(57) ABSTRACT

A method for steering packets, including receiving a packet and determining parameters to be used in steering the packet to a specific destination, in one or more initial steering stages, based on one or more packet specific attributes. The method further includes determining an identity of the specific destination of the packet in one or more subsequent steering stages, governed by the parameters determined in the one or more initial stages and one or more packet specific attributes, and forwarding the packet to the determined specific destination.

17 Claims, 7 Drawing Sheets

(56) References Cited

U.S. PATENT DOCUMENTS

| | | | |
|---|---|---|---|
| 2007/0058536 | A1 | 3/2007 | Vaananen et al. |
| 2007/0211741 | A1 | 9/2007 | Kagan et al. |
| 2008/0013549 | A1* | 1/2008 | Okagawa et al. ............ 370/397 |
| 2008/0080505 | A1* | 4/2008 | Munoz ........................... 370/392 |
| 2008/0112415 | A1 | 5/2008 | Sobaje |
| 2008/0189432 | A1 | 8/2008 | Abali et al. |
| 2008/0205403 | A1* | 8/2008 | Akyol ................. H04L 45/7453 370/392 |
| 2009/0077567 | A1 | 3/2009 | Craddock et al. |
| 2009/0119565 | A1 | 5/2009 | Park et al. |
| 2009/0141734 | A1* | 6/2009 | Brown et al. ................. 370/419 |
| 2009/0238181 | A1* | 9/2009 | Desai et al. ................... 370/389 |
| 2010/0039959 | A1 | 2/2010 | Gilmartin |
| 2010/0118875 | A1* | 5/2010 | Lebizay et al. ............... 370/392 |
| 2010/0220732 | A1* | 9/2010 | Hussain et al. .......... 370/395.53 |
| 2010/0284404 | A1* | 11/2010 | Gopinath et al. ............ 370/392 |
| 2010/0290475 | A1* | 11/2010 | Belanger et al. ............. 370/401 |
| 2010/0315958 | A1 | 12/2010 | Luo et al. |
| 2011/0064084 | A1* | 3/2011 | Tatar et al. .................... 370/392 |
| 2011/0096668 | A1 | 4/2011 | Bloch et al. |
| 2011/0134753 | A1 | 6/2011 | Kashyap |
| 2012/0300669 | A1 | 11/2012 | Zahavi |
| 2012/0314706 | A1 | 12/2012 | Liss |
| 2013/0151744 | A1 | 6/2013 | Gupta et al. |

OTHER PUBLICATIONS

Gusat et al., "R3C2: Reactive Route & Rate Control for CEE", Proceedings of 18th IEEE Symposium on High Performance Interconnects, New York, USA, pp. 50-57, Aug. 10-27, 2010.

Wu et al., "DARD: Distributed adaptive routing datacenter networks", Proceedings of IEEE 32nd International Conference Distributed Computing Systems, pp. 32-41, Jun. 18-21, 2012.

Ding et al., "Level-wise scheduling algorithm for fat tree interconnection networks", Proceedings of the 2006 ACM/IEEE Conference on Supercomputing (SC 2006), 9 pages, Nov. 2006.

Joseph, S., "Adaptive routing in distributed decentralized systems: NeuroGrid, Gnutella & Freenet", Proceedings of Workshop on Infrastructure for Agents, MAS and Scalable MAS, Montreal, Canada, 11 pages, year 2001.

Martinez et al., "Supporting fully adaptive routing in Infiniband networks", Proceedings of the International Parallel and Distributed Processing Symposium (IPDPS'03), Nice, France, 10 pages, Apr. 22-26, 2003.

Kagan et al., U.S. Appl. No. 13/481,890, filed May 28, 2012.
Haramaty et al.,, U.S. Appl. No. 13/754,921, filed Jan. 31, 2013.
U.S. Appl. No. 13/481,890 Office Action dated Dec. 9, 2013.
Leiserson, C E., "Fat-Trees: Universal Networks for Hardware Efficient Supercomputing", IEEE Transactions on Computers, vol. C-34, No. 10, pp. 892-901, Oct. 1985.
Ohring et al., "On Generalized Fat Trees", Proceedings of the 9th International Symposium on Parallel Processing, pp. 37-44, Santa Barbara, USA, Apr. 25-28, 1995.
Zahavi, E., "D-Mod-K Routing Providing Non-Blocking Traffic for Shift Permutations on Real Life Fat Trees", CCIT Technical Report #776, Technion—Israel Institute of Technology, Haifa, Israel, Aug. 2010.
Yuan et al., "Oblivious Routing for Fat-Tree Based System Area Networks with Uncertain Traffic Demands", Proceedings of ACM SIGMETRICS—the International Conference on Measurement and Modeling of Computer Systems, pp. 337-348, San Diego, USA, Jun. 12-16, 2007.
Matsuoka S., "You Don't Really Need Big Fat Switches Anymore—Almost", IPSJ SIG Technical Reports, vol. 2003, No. 83, pp. 157-162, year 2003.
Kim et al., "Technology-Driven, Highly-Scalable Dragonfly Topology", 35th International Symposium on Computer Architecture, pp. 77-78, Beijing, China, Jun. 21-25, 2008.
Jiang et al., "Indirect Adaptive Routing on Large Scale Interconnection Networks", 36th International Symposium on Computer Architecture, pp. 220-231, Austin, USA, Jun. 20-24, 2009.
Minkenberg et al., "Adaptive Routing in Data Center Bridges", Proceedings of 17th IEEE Symposium on High Performance Interconnects, New York, USA, pp. 33-41, Aug. 25-27, 2009.
Kim et al., "Adaptive Routing in High-Radix Clos Network", Proceedings of the 2006 ACM/IEEE Conference on Supercomputing (SC2006), Tampa, USA, Nov. 2006.
Infiniband Trade Association, "InfiniBandTM Architecture Specification vol. 1", Release 1.2.1, Nov. 2007.
Culley et al., "Marker PDU Aligned Framing for TCP Specification", IETF Network Working Group, RFC 5044, Oct. 2007.
Shah et al., "Direct Data Placement over Reliable Transports", IETF Network Working Group, RFC 5041, Oct. 2007.
U.S. Appl. No. 13/154,458, filed Jun. 7, 2011.
U.S. Appl. No. 13/114,071, filed May 24, 2011.
U.S. Appl. No. 13/481,890, filed May 28, 2012.
U.S. Appl. No. 13/481,890 Office Action dated May 21, 2014.

* cited by examiner

PACKET STEERING

FIELD OF THE INVENTION

The present invention relates generally to methods and devices for data transmission, and specifically to packet steering.

BACKGROUND OF THE INVENTION

A network interface controller (NIC) (referred to in certain networks as a host bus adapter (HBA) or host channel adapter (HCA)) is a unit which manages the communications between a computer (e.g., a server) and a network, such as a local area network or switch fabric. The NIC directs packets from the network to their destination in the computer, for example by placing the packets in a buffer of a destination application in a memory unit of the computer and directs outgoing packets, for example sending them either to the network or to a loopback port. The directing of packets to their destination is generally referred to as steering, which includes determining a required destination of the packet and forwarding the packet to its destination.

When a physical server supports a plurality of virtual machines (VMs), different approaches are taken by the NIC in directing the packets. In one approach, all packets are directed to a virtual machine monitor (VMM) and the VMM directs the packets to the specific destination virtual machine. This approach, however, increases the load imposed by the VMM on the host CPU.

US patent publication 2008/0189432 to Abali et al. describes a method of adjusting virtual host channel adapter configuration to virtual machine migration.

U.S. Pat. No. 7,286,535 to Ishikawa et al., the disclosure of which is incorporated herein by reference, describes using a content addressable memory (CAM) to implement a lookup table in a packet forwarding device.

U.S. Pat. No. 7,746,854 to Ambe et al., the disclosure of which is incorporated herein by reference, describes a fast flexible filter processor (FFFP) which parses incoming packets based on programmable mask fields and accordingly generates action instructions based on programmable rules.

SUMMARY OF THE INVENTION

Embodiments of the present invention that are described hereinbelow provide packet steering apparatus and methods.

There is therefore provided in accordance with an embodiment of the present invention, a method of steering a packet, including receiving a packet by a packet steering unit, determining parameters to be used in steering the packet to a specific destination, in one or more initial steering stages, based on one or more packet specific attributes, determining an identity of the specific destination of the packet in one or more subsequent steering stages, governed by the parameters determined in the one or more initial stages and one or more packet specific attributes and forwarding the packet to the determined specific destination.

Optionally, determining parameters to be used in steering the packet includes determining a lookup table used in the one or more subsequent stages. Optionally, determining parameters to be used in steering the packet includes determining a key to be used in accessing the lookup table in the one or more subsequent stages.

Optionally, each of the one or more steering stages includes accessing a lookup table. Optionally, the one or more initial stages and the one or more subsequent stages include together accessing a plurality of different lookup tables. Optionally, the one or more initial and subsequent stages include accessing a plurality of different lookup tables, each corresponding to a respective virtual machine on a computer serviced by the packet steering unit. Optionally, the packet includes an Infini-Band unicast packet.

Optionally, the method includes receiving a multicast packet and forwarding the multicast packet based on a lookup to one or more steering tables.

Optionally, the packet steering unit handles one or more other packets between at least some pairs of stages of unicast and/or multicast packets. In some embodiments, the packet steering unit handles one or more other packets between each pair of stages of handling a single unicast and/or multicast packet.

Optionally, the packet specific attributes include information in the packet. Alternatively, the packet specific attributes include information on the packet not included in the packet. Optionally, the method includes forwarding the packet to at least one additional destination, based on information from one or more of the stages. Optionally, forwarding the packet to the at least one additional destination includes forwarding before the one or more subsequent stages.

Optionally, forwarding the packet to the at least one additional destination includes forwarding to a plurality of destinations determined in a single stage.

Optionally, in each stage only fields from a single protocol-layer header are used in determining the parameters or the destination identity.

Optionally, determining the parameters and the identity of the specific destination of the packet include a first specific total number of stages, and including receiving an additional packet and forwarding the additional packet after a second specific total number of stages different from the first specific total number of stages.

Optionally, determining the parameters and the identity of the specific destination of the packet include accessing a first specific total number of fields of the packet, and including receiving an additional packet and forwarding the additional packet after accessing a second specific total number of fields of the additional packet, different from the first specific total number of fields.

Optionally, determining the parameters and the identity of the specific destination of the packet include accessing a specific set of fields of the packet, and including receiving an additional packet and forwarding the additional packet after accessing at least one field not included in the specific set.

There is further provided in accordance with an embodiment of the present invention, a packet steering unit, including at least one packet queue in which packets containing information are accumulated, one or more steering tables configured with entries including instructions for handling corresponding InfiniBand packets responsively to the information contained therein and a steering engine configured to identify for each unicast InfiniBand packet in the packet queue, responsively to the information contained in the packet, a corresponding entry of a table of the one or more steering tables and to handle the packet according to the corresponding entry.

Optionally, at least some of the entries of the one or more steering tables include instructions on a further handling stage to be performed for the corresponding packets.

Optionally, the steering engine is additionally configured to identify for multicast packets in the packet queue, responsively to the information contained in the packet, a corresponding entry of a table and to handle the packet according to the corresponding entry.

Optionally, the steering engine is additionally configured to identify for non-InfiniBand packets in the packet queue, responsively to the information contained in the packet, a corresponding entry of a table and to handle the packet according to the corresponding entry. Optionally, the one or more steering tables include a plurality of steering tables. Optionally, the plurality of steering tables includes at least two tables having entries of different sizes.

There is further provided in accordance with an embodiment of the present invention, a packet steering unit, including an input interface configured to receive packets for steering, one or more memory units configured with instructions on fields of packets to be used in determining steering destinations of packets; and a hardware-logic steering engine configured to determine steering destinations of packets received through the input interface, by examining the fields indicated by the one or more memory units, and accordingly to steer the packets.

Optionally, the input interface includes a plurality of ports, wherein at least one of the ports can receive packets of different protocols according to user configuration.

Optionally, the input interface includes a plurality of ports configured to receive packets in accordance with different protocols and wherein the steering engine is configured to steer packets of the different protocols concurrently. Optionally, the one or more memory units are configured with a plurality of steering tables including the instructions on fields of packets to be used in determining steering destinations of packets.

Optionally, the hardware-logic steering engine is configured to access a plurality of table entries in determining for one or more packets a single destination. Optionally, the hardware-logic steering engine is configured to use different packet fields in accessing each of the plurality of table entries. Optionally, each table entry includes an instruction on whether an additional lookup stage should be performed for the current packet and the packet fields to be used in the additional lookup stage, if an additional lookup is to be performed. Optionally, the hardware-logic steering engine is configured to access different numbers of table entries for different packets.

Optionally, the hardware-logic steering engine is configured to access entries of a plurality of tables in determining for one or more packets a single destination.

Optionally, the hardware-logic steering engine is configured to access a plurality of tables having different entry sizes, in determining for one or more packets a single destination.

Optionally, the packet steering unit includes a memory unit configured with a list of packet field arrangements and wherein the steering engine is configured to determine for each packet handling stage it performs, an entry of the list which determines the fields of the packets to be used in the stage. Optionally, the steering unit is configured to handle a plurality of packets concurrently.

Optionally, the steering unit is configured to be able to examine different fields of packets handled concurrently.

There is further provided in accordance with an embodiment of the present invention, a packet steering unit, including an input interface configured to receive packets for steering, a packet pool for storing a plurality of packets from the input interface concurrently, at least one memory unit configured with one or more steering tables having entries including instructions for forwarding corresponding packets and instructions on a further handling stage to be performed for the corresponding packets, and a hardware-logic steering engine configured to perform handling stages in which the engine determines for a packet in the packet pool a corresponding entry in the at least one memory unit and handles the packet according to the instructions in the corresponding entry, wherein the steering engine is configured to handle a plurality of packets concurrently, such that at least some first packets are handled between a plurality of handling stages of a single second packet. Optionally, the packet pool is configured to store at least 16 packets.

Optionally, the hardware-logic steering engine is configured to sequentially go through the packets in the packet pool and perform on each packet in the pool a single handling stage each time it is reached sequentially.

Optionally, the one or more steering tables are configured with instructions such that at least one packet undergoes a plurality of handling stages for determining a single destination of the packet.

Optionally, the packet pool includes for each packet which previously underwent a handling session, an indication of a set of parameters to be used in handling the packet by the steering engine in a next handling stage.

Optionally, the one or more steering tables are configured with instructions such that different packets undergo different numbers of handling stages. Optionally, at least one packet undergoes only a single handling stage.

Optionally, the one or more steering tables are configured with instructions such that at least one packet undergoes at least three handling stages, in selecting a single destination of the packet. Optionally, the one or more steering tables are configured with instructions such that at least one packet undergoes at least five handling stages.

Optionally, the steering engine is configured to determine for packets a corresponding entry of the table, based on one or more fields of the packet.

Optionally, the one or more fields of the packet used by the steering engine in any specific handling stage of a packet include fields of only a single protocol layer.

Optionally, the one or more fields of the packet used by the steering engine in at least one specific handling stage of a packet include fields of a plurality of different protocol layers. Optionally, the one or more steering tables include a plurality of different steering tables.

There is further provided in accordance with an embodiment of the present invention, a packet steering unit, including at least one packet queue in which packets containing information are accumulated, one or more steering tables configured with entries including instructions on a destination of corresponding packets or on an additional table entry lookup to be performed for the packet, and a steering engine configured to access for each packet in the packet queue, responsively to the information contained in the packet, a corresponding table entry and to handle the packet according to the corresponding entry, including, for at least some packets, accessing an additional table entry indicated by the accessed entry.

Optionally, the one or more steering tables are configured to have the steering engine access entries of a plurality of steering tables in handling at least one of the packets. Optionally, the one or more steering tables are configured to have the steering engine access entries of different sizes in handling at least one of the packets.

The present invention will be more fully understood from the following detailed description of the embodiments thereof, taken together with the drawings in which:

DETAILED DESCRIPTION OF EMBODIMENTS

Figure 1:
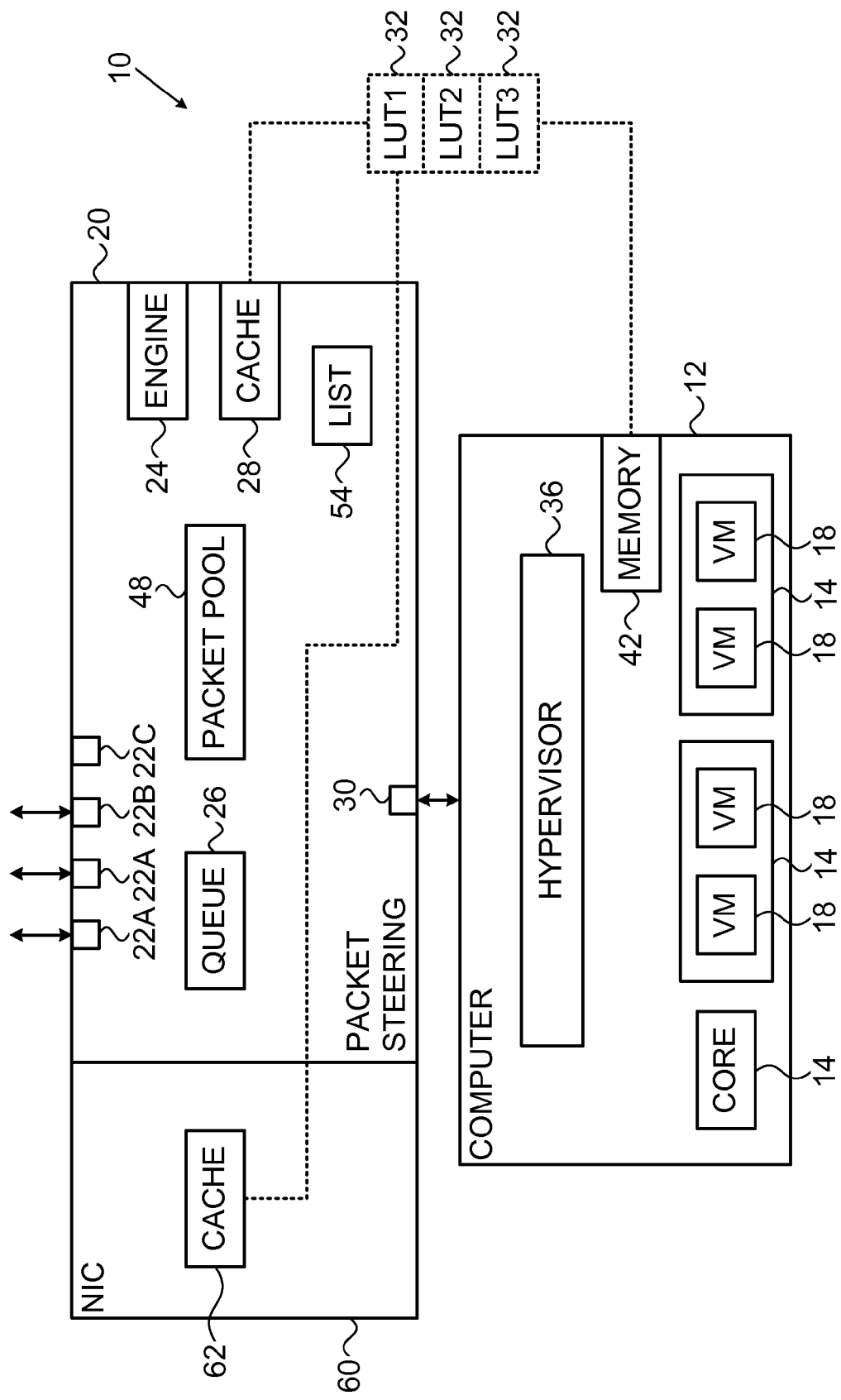
FIG. 1 is a schematic block diagram of a computer system including a packet steering unit, in accordance with an embodiment of the present invention.

Embodiments of the present invention relate to packet steering by a network interface controller (NIC). The steering optionally includes determining for packets, based on their headers, a destination to which they are forwarded. The destination may be identified, for example, by a virtual unit identity, such as a virtual HCA-ID, and by a flow interface, e.g., an InfiniBand queue pair (QP) or an Ethernet receive ring.

An aspect of some embodiments of the invention relates to a packet steering unit which performs a multi-stage steering process in determining a single destination of the packet. The multi-stage steering process includes a plurality of stages in which a table lookup is performed based on packet specific information, e.g., address information in the packet. The packet specific information may include information in the packet and/or information on the packet not included in the packet, such as the port through which the packet was received. It is noted that the multi-stage steering process may forward the packet to additional destinations, in addition to the single destination. Furthermore, a single stage may be used to steer the packet to a plurality of the additional destinations.

The use of a plurality of stages to forward packets to their destination, allows gearing the steering process to the specific packet being handled. In each stage, the parameters of the next lookup stage are optionally selected, so that in each stage only the relevant parameters are consulted. Thus, the steering tables are smaller, the hardware of the packet steering unit is simpler, and the steering configuration is more flexible.

In some embodiments of the invention, different packets are steered to their destination in a different number of stages. Using different numbers of stages for different packets allows for more efficient steering, applying more stages to packets requiring complex steering and allowing for low latency forwarding of some of the packets. By allowing the packet information to be consulted for steering in a plurality of different stages, the amount of packet information consulted for some packets may be larger than for other packets, allowing more flexibility in the steering process. In addition, the steering may relate to different packet fields for different packets. For example, the packet steering for specific streams requiring load balancing between CPU cores may take into account one or more fields, such as source and destination IP address fields and/or UDP or TCP port fields, in performing load balancing by the steering unit. For other streams, not requiring load balancing, the steering unit does not examine these fields at all, such that the steering of these other streams is achieved much faster.

An aspect of some embodiments of the invention relates to a packet steering unit which is configured to access a steering table for InfiniBand unicast packets. Optionally, the packet steering unit consults a steering table for all packets it handles. While the access to the steering table for InfiniBand unicast packets adds to the complexity of the steering, it allows performing a more complex steering by the packet steering unit and therefore reduces the load on a computer serviced by the steering unit, by directing packets more accurately to their destination, e.g., to their intended vHCA.

An aspect of some embodiments of the invention relates to a hardware-implemented packet steering unit which is configured to determine the fields of the steered packets to be used in the steering, according to software configured instructions.

Using software configured instructions allows more flexibility in performing the steering and in the extent of tasks performed by the packet steering unit.

In some embodiments of the invention, the steering unit is configured with a plurality of packet field arrangements which may be used for received packets, and for each packet stream, a table of the packet steering unit is configured with the specific field arrangement to be used. Optionally, the handling of different packets and/or the different handling stages use different field arrangements, substantially concurrently.

Optionally, the software instructions defining the packet fields used in the steering are configured each time the packet steering unit is employed for a different computer environment. Alternatively or additionally, the software instructions defining the packet fields used in the steering may be reconfigured when a new virtual machine is defined and/or when new devices are connected to the computer system. Further alternatively or additionally, the software instructions defining the packet fields used in the steering are configured when new connections are established.

Optionally, the software configured instructions include an indication of whether to perform an additional lookup stage, such that each packet is handled in a number of stages configured for the packet. Optionally, the number of stages applied to a specific packet is unlimited and may be more than three, more than 5 or even more than 7 stages. In some embodiments of the invention, each stage relates to one or more different destinations to which the packet is to be forwarded. For example, one stage may determine the packet destination, a second stage may determine a sniffer destination and a third stage may determine an error-alert destination. In other embodiments of the invention, a plurality of stages may be used in determining a single destination. For example, a first stage may be used to determine a core or virtual machine (VM) to which the packet is to be forwarded and a second stage determines the QP to which the packet is to be forwarded. This allows using a much smaller number of steering table entries than would be required if each pair of VM and QP were required to have a separate table entry.

An aspect of some embodiments of the invention relates to a hardware packet steering unit which handles a plurality of packets concurrently, such that the steering of a second packet may begin after the steering of a first packet began, but before the steering of the first packet was completed. The handling of a plurality of packets concurrently allows the steering unit to continue operating even when the steering of one or more packets is stalled, for example while waiting for data not present in local caches, required for the steering, to be fetched from a host memory.

In some embodiments of the invention, the packet steering unit comprises a single steering engine which handles concurrently at least 8, at least 16 or even at least 32 packet contexts. Alternatively or additionally, the packet steering unit includes a plurality of steering engines which operate concurrently.

An aspect of some embodiments of the invention relates to a network interface controller (NIC) configured to consult a plurality of different tables in steering packets to their destinations.

In some embodiments of the invention, the different tables are used for different packets, each packet being steered by a single corresponding table. In other embodiments, a single packet may be directed to a plurality of destinations, while consulting a plurality of tables. In some embodiments, a single packet is directed to a single destination while consulting a plurality of tables, in a plurality of lookup stages.

Optionally, different tables are defined for different cores and/or for different virtual machines. Alternatively or additionally, different tables are defined for packets governed by different protocols. Allowing a NIC to perform steering using a plurality of different tables allows the NIC to perform tasks which cannot be performed by a NIC using a single table and/or to perform tasks in a much simpler manner than can be performed with a single table.

In some embodiments of the invention, the NIC performs for received packets one or more stages in which one or more tables to be used in steering the packet are selected.

Optionally, the different tables are stored at different memory locations. Alternatively or additionally, the different tables are accessed by different table keys, tags and/or masks, depending on different fields of the packet. In some embodiments, the different tables have different entry and/or total sizes.

In some embodiments, the NIC performs the steering for virtual machines (VMs) as a plurality of virtual host channel adapters (vHCAs), such that each VM is serviced as if it is handled by one or more separate packet steering units. Optionally, for each vHCA, the NIC manages separate steering tables, separate QP tables and/or separate completion queues. Optionally, the NIC manages a root steering table used in an initial stage for handling all received packets. In the initial stage the vHCA to which the packet belongs is determined and accordingly the parameters of further steering stages are determined. Alternatively to a single root steering table and initial steering stage, a plurality of initial steering stages may be used until the corresponding vHCA is determined.

While the need to determine the corresponding vHCA adds to the complexity of the packet steering unit, the advantage of directing the management packets directly to their intended VM, in a manner which allows complete virtual HCA operation, is considered in accordance with some embodiments of the invention to outweigh the added steering unit complexity.

Optionally, for handling multicast packets directed to addresses in more than one VM, the tables of the vHCAs corresponding to the VMs are configured to forward the packet to the addresses in their corresponding VM and to transfer the packet to a next stage corresponding to a different vHCA for further handling.

Although certain embodiments are described below in the specific context of an InfiniBand network and HCA, the principles of the present invention may similarly be applied in NICs that support Ethernet communications, as well as other network standards.

System Overview

FIG. 1 is a schematic block diagram of a computer system 10 including a packet steering unit 20, in accordance with an embodiment of the present invention. Computer system 10 optionally includes a computer 12 and a network interface controller (NIC) 60, which includes packet steering unit 20. In some embodiments, computer 12 includes a plurality of cores 14. Optionally, computer 12 is configured to manage a plurality of virtual machines (VMs) 18, as is known in the art, and a hypervisor 36 (or another virtualization system), runs on computer 12, managing the virtualization. Generally, hypervisor 36 runs on a core 14 of computer 20 which performs other tasks, although it may run on a separate, dedicated, core. NIC 60 may comprise an InfiniBand HCA, a host bus adapter (HBA) or any other type of NIC or equivalent device.

Packet steering unit 20 comprises a packet queue 26 in which packets waiting for steering are accumulated. One or more input ports 22, belonging to an input interface, provide packets to packet steering unit 20 and these packets are stored in packet queue 26. Input ports 22 may include, an InfiniBand port 22A, an Ethernet port 22B and/or a loopback port 22C (which although shown near the other ports may be connected to computer 20 or may be entirely virtual), for example. In some embodiments of the invention, NIC 60 may include for at least one port type, a plurality of ports, as illustrated in FIG. 1 by the inclusion of two InfiniBand ports 22A. In some embodiments, NIC 60 includes a predetermined number of ports, e.g., two, which can be configured to a specific type of interface, according to the current needs of system 10. Such ports 22 may be configured by the user to the specific type of interface or may be designed to automatically identify the interface to which the port is connected and to operate accordingly.

In some embodiments of the invention, packet steering unit 20 is configured to operate as a plurality of virtual HCAs, giving the respective VMs 18 the impression that they are serviced by dedicated HCAs. It is noted that a VM 18 may be assigned more than one virtual HCA (vHCA).

A steering engine 24 takes packets from queue 26, examines them in one or more lookup stages to determine their destination and forwards them to the determined destination. The destination may be indicated by a local ID (LID), formed of a pair including a virtual unit identity, identifying the virtual unit to which the packet is directed, and a flow interface which identifies a specific flow on the virtual unit.

The virtual unit identity optionally includes a virtual HCA-ID, sometimes referred to as a virtual NIC-ID or as a global virtual machine indicator (GVMI). Alternatively, the virtual unit identity identifies a VM 18. It is noted that in embodiments in which each VM 18 is assigned only a single vHCA, the use of a VM identity is substantially equivalent to the use of a vHCA. The flow interface is, for example, an InfiniBand queue pair (QP) or an Ethernet receive ring. The LID is optionally used in forwarding the packet through an output interface 30 to its destination. Generally, the forwarding includes storing the packet in a specific address in a memory 42 of computer 12 corresponding to the LID, although other forwarding methods may be used. While the following description relates mainly to packets from a network to computer 12, packet steering unit 20 may handle, in a similar manner, packets from computer 12 being transmitted to the network.

Engine 24 is optionally implemented in hardware logic, for example by a VLSI circuit designed especially for the steering task, such as an application specific integrated circuit (ASIC), or by a suitably configured field-programmable gate array (FPGA), in order to achieve high operation rates. The task of the hardware logic is generally not changeable after its initial configuration for the steering task. It is noted, however, that in some embodiments, engine 24 may be implemented at least partially in firmware and/or software. Engine 24 optionally operates at a rate of handling at least 10 Giga packets per second (gps), at least 50 gps or even at least 100 gps.

Engine 24 consults one or more lookup tables 32 which include entries associating between packets having specific parameter values and their corresponding steering instructions. Optionally, the lookup tables 32 are implemented by a plurality of different memory units in accordance with a caching scheme. In some embodiments, a lowest level of the caching scheme is managed in main memory 42 of computer 12 serviced by packet steering unit 20. One or more cache units which store portions of lookup table 32 are optionally included in NIC 60. In some embodiments, a first cache unit 62 is shared by engine 24 with other units of NIC 60, while a second cache unit 28 is dedicated for use only by engine 24. The use of this caching scheme allows using very large tables 32, which cannot be hosted entirely in cache unit 28 and/or cache unit 62. Alternatively, a simpler caching scheme of only two stages may be used. In other embodiments, the tables 32 are stored entirely in a single memory unit of NIC 60 and caching is not performed.

Optionally, engine 24 manages a list 54 of predetermined sets of packet parameters for different types of packets and for different stages, as discussed more in detail hereinbelow. List 54 may be hosted by a dedicated memory unit of packet steering unit 20 or may be stored in cache 28 or any other suitable memory unit of NIC 60.

In some embodiments of the invention, packet steering unit 20 consults a plurality of tables 32, corresponding to packets of different attributes. For example, different tables 32 may be managed for different protocols, different VMs 18 and/or for different cores 14.

The different tables 32 may all have entries of the same size, or different tables may have entries of different sizes. For example, tables 32 for steering unicast packets may have relatively small entries, while tables for steering multicast packets may have larger entries which can carry a list of multiple multicast destinations for a single vHCA or VM 18 or even for a plurality of VMs 18.

In some embodiments of the invention, engine 24 handles a plurality of packets, e.g., 16, 32 or 64, in parallel. Optionally, packets being handled are stored with a context of the status of their handling in a temporary packet pool 48. Engine 24 optionally sequentially passes through the packets in temporary packet pool 48 and performs for each packet a single table lookup stage before moving to the next packet. In some embodiments of the invention, each packet in packet pool 48 is associated with an indication as to whether the packet is blocked for handling, and engine 24 skips handling packets that are blocked. The blocking may be performed, for example, to avoid changing the order of packets within a stream and/or when resources required for handling are being fetched, as discussed hereinbelow.

Each lookup results in an indication of a next handling stage of the packet or an indication that the handling of the packet was completed. When the handling of a packet in packet pool 48 is completed, a new packet is loaded from queue 26 into packet pool 48.

Optionally, when during handling a packet, it is determined that an additional handling stage is to be performed on the packet, engine 24 checks that resources required for performing the next stage are available, and if necessary initiates their retrieval, such that when the engine 24 returns to handling the packet the resources are available. For example, engine 24 may verify that the table 32 required for the next stage is in cache 28 and instruct a caching sub-system to retrieve the table, if necessary, such that the table will be available the next time engine 24 handles the packet. Optionally, the number of packets in packet pool 48 is selected such that the resources for each specific packet will generally be available by the time engine 24 returns to the specific packet after handling the other packets. Alternatively or additionally, engine 24 checks each packet whether it is ready for processing and skips to a next packet if the resources required for handling a packet are not available. In some embodiments, instead of repeatedly polling each packet in packet pool 48, packets that are not ready are marked as blocked and they are not polled until a notification that the resources required for the packet are available, is received.

When a new destination address and/or a new QP is associated with computer 12 and/or with one or more virtual machines (VMs) 18 on computer 12, the VMs 18 and/or hypervisor 36 optionally configure entries in tables 32 corresponding to the new destination address and/or new QP, as will be understood from the below description.

Optionally, the configuration of tables 32 is performed by VMs 18 only through system calls to hypervisor 36, in order to prevent errors in the configuration. The configuration may be performed by firmware and/or software.

Packet and Table Details

Figure 2:
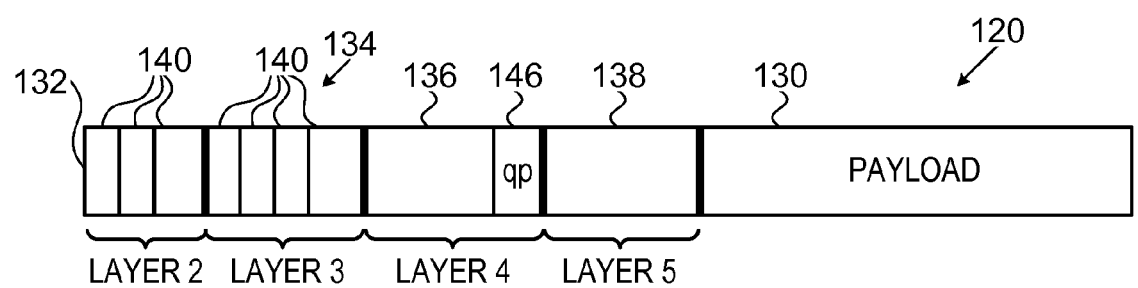
FIG. 2 is a schematic illustration of a general structure of Infiniband packets handled by a packet steering unit, in accordance with embodiments of the present invention.

FIG. 2 is a schematic illustration of a general structure of packets 120 handled by packet steering unit 20, in accordance with embodiments of the present invention. Packets 120 generally include a payload section 130 and a plurality of headers, for example a layer-2 header 132, a layer-3 header 134, a layer-4 header 136 and a layer-5 header 138. Each header includes one or more fields 140. Some of the fields 140 indicate the destination of the packet, such as a QP field 146 in layer-4 header 136, in Infiniband packets. Other fields 140 indicate the structure of higher protocol layer headers. For example, the fields 140 of layer-3 header 134 may indicate the source and destination layer-3 addresses of the packet, as well as the type of layer-4 header 136, which is indicative of the specific field structure of the layer-4 header 136. Various protocols known in the art govern the field structures which may be used in packets 120.

It is noted that packet 120 of FIG. 2 is provided for illustration purposes and that packet steering unit 20 may operate with packets having other structures.

Figure 3:
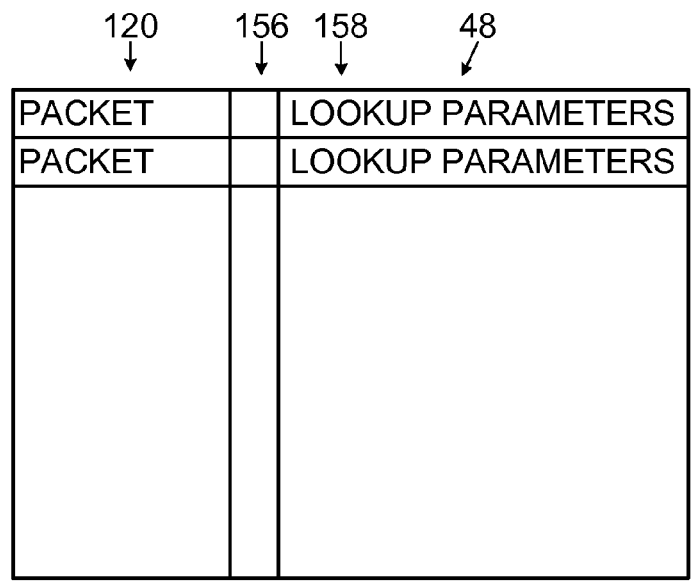
FIG. 3 is a schematic illustration of a packet pool, in accordance with an embodiment of the invention.

FIG. 3 is a schematic illustration of packet pool 48, in accordance with an embodiment of the invention. Packet pool optionally includes packets 120 and for each packet an indication 156 of whether the packet was previously handled. For packets previously handled, packet pool 48 optionally includes a set 158 of steering table lookup parameters to be used in a next handling stage of the packet. Alternatively to using separate fields for the indication 156 of whether the packet was previously handled and the set 158 of steering table lookup parameters, only a field for the set of steering table lookup parameters 158 is used, and a specific dummy value in this field indicates that the packet was not previously handled.

Figure 4:
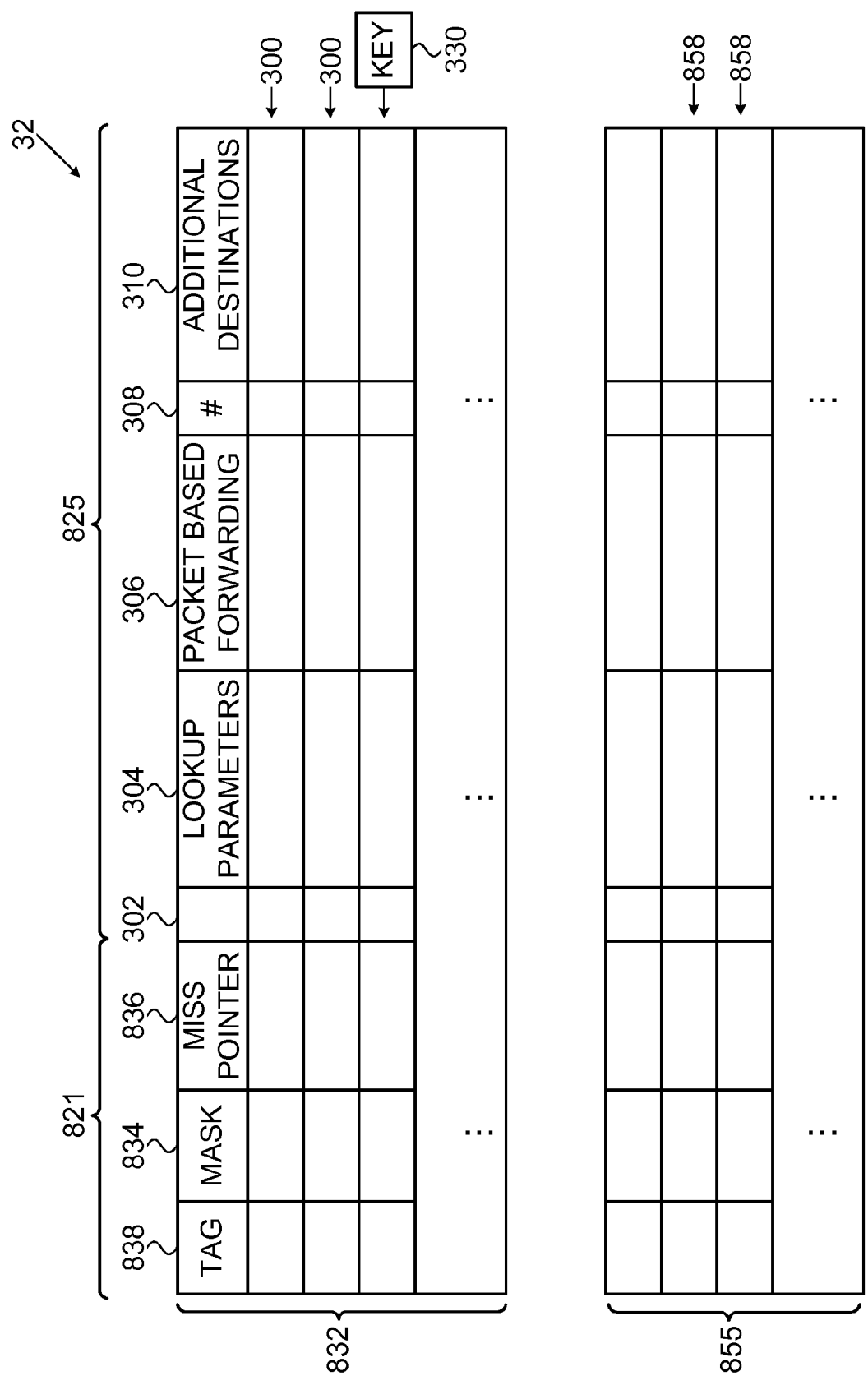
FIG. 4 is a schematic illustration of a steering table, in accordance with an embodiment of the invention.

FIG. 4 is a schematic illustration of a table 32, in accordance with an embodiment of the invention. Table 32 comprises entries 300 which include lookup management fields 821, and entry fields 825. In some embodiments, table 32 includes a structured area 832 in which the entries 300 have same sizes, and an extension area 855, for entries 858 not fitting in structured area 832. The details of management fields 821 and extension area 855 are discussed further hereinbelow.

Entry fields 825 optionally include a field 302 indicating whether an additional stage is required and a field 304 including the steering table lookup parameters to be used in a further stage, if required. Entries 300 further include a packet-based forwarding field 306 indicating whether the packet is to be forwarded to a destination at least partially indicated by one or more fields 140 of the packet. Field 306 further indicates which field or fields 140 should be used in the forwarding and/or partial destination information for the forwarding.

In some embodiments of the invention, table entry 300 further includes an additional destination number field 308, which indicates how many additional copies of the packet should be generated. When the value of additional destination number field 308 is greater than zero, entry 300 optionally includes an additional destination field 310 which indicates for each additional copy, the destination of the copy. Optionally, additional destination field 310 is sufficiently large to accommodate any practical number of additional destinations. Alternatively, additional destination field 310 includes space for a predetermined number of destinations and also includes a link to an additional list outside the table, in which further destinations are listed when necessary. Further alternatively, additional destination field 310 includes only a pointer to a list of destinations stored outside table 32. A further alternative is described hereinbelow with reference to a hash scheme embodiment.

It is noted that in some embodiments, additional copies may be forwarded to their destinations, while the packet itself is kept in pool 48 for an additional steering stage.

Referring in more detail to packet-based forwarding field 306, optionally, the packet-based forwarding field 306 includes a sub-field indicating whether packet-based forwarding is to be performed.

For transmitted packets, packet-based forwarding field 306 optionally includes a field which indicates whether loopback is used and a field which indicates to which wire the packet is forwarded if not a loopback packet. For received packets, the packet-based forwarding field 306 optionally includes a vHCA-ID and an indication of the field 140 from which to take the QP. It is noted, however, that the field 140 from which to extract the QP may be predetermined such that an indication in entry 300 is not required.

Engine Operation

Engine 24 sequentially passes over the packets in packet pool 48, performing for each packet a single lookup stage before moving on to the next packet. Alternatively to passing over the packets sequentially, each packet in packet pool 48 may be marked as to whether it is ready for further lookup, with an urgency rating and/or with an indication of whether it is blocked until the handling of another packet is completed, and accordingly engine 24 determines the order in which it handles the packets.

Figure 5:
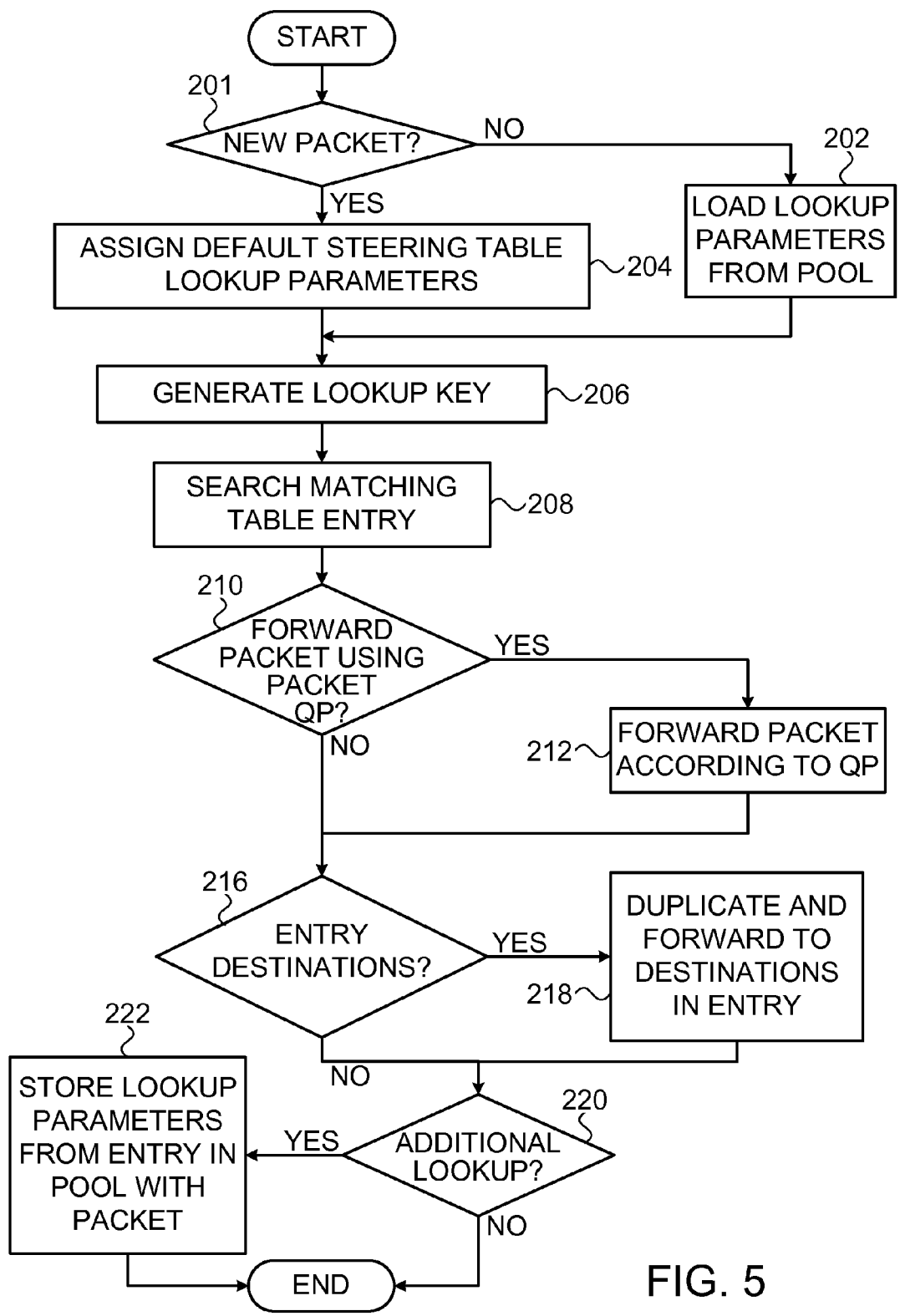
FIG. 5 is a flowchart of acts performed by a steering engine in handling a packet, in accordance with an embodiment of the invention.

FIG. 5 is a flowchart of acts performed by steering engine 24 in handling a packet in packet pool 48, in accordance with an embodiment of the invention. When engine encounters (201) a new packet, for example according to indication 156, it assigns (204) the packet a set 158 of default steering table lookup parameters, to be used in handling the packet in the current stage. For packets already previously handled, engine 24 loads (202) the lookup parameters stored with the packet in packet pool 48.

A lookup key 330 (FIG. 6) is generated (206) based on the steering table lookup parameters and the packet 120, and engine 24 searches (208) for an entry 300 of lookup table 32 corresponding to the lookup key 330. If (210) packet-based forwarding field 306 indicates that packet-based forwarding is to be performed, the packet is forwarded (212) based on destination information from the packet and possibly information from the entry 300.

If (216) the value of additional destination number field 308 is greater than zero, the packet is duplicated (218) according to the number of duplicates, and each packet copy is forwarded to a corresponding destination indicated in the additional destination field 310, for example identified by a vHCA-ID and QP.

If (220) field 302 indicates that an additional lookup stage is required, steering table lookup parameters from field 304 of the entry 300 are stored (222) for the packet in packet pool 48 in preparation for another lookup stage of the packet.

In summary, in the embodiment illustrated by FIG. 5, in each lookup stage performed on a packet, a packet may be forwarded to an address identified at least partially by a field 140 of the packet, the packet may be forwarded to one or more addresses listed in a corresponding table entry 300 and/or the packet may be scheduled for an additional lookup stage. Optionally, each lookup stage may result in one or more of the above possibilities. For example, in a first specific lookup stage a packet may be forwarded only according to a destination identified in the packet and in a second specific stage a packet may be forwarded only to one or more addresses in the corresponding entry. In other specific lookup stages the packet is not forwarded at all and the stage results only in scheduling an additional lookup stage. Still other lookup stages may result in both forwarding to a destination identified in the packet and one or more additional destinations in the entry 300.

Packet Extraction

In some embodiments of the invention, queue 26 is a FIFO (first-in, first-out) queue and packets are extracted from the queue according to the order in which they entered the queue. Alternatively or additionally, packets are assigned a quality of service (QoS) score and the order in which the packets are extracted from queue 26 depends at least partially on their QoS score.

The extraction may include an actual copying of the entire packet to packet pool 48 and removal from queue 26, or may be a virtual extraction which is actually carried out only upon completion of the last stage of handling of the packet 120.

Optionally, packet steering unit 20 is adapted to identify cases in which a second packet received after a first packet should not be forwarded before the first packet. In such cases, the second packet in packet pool 48 is optionally marked as blocked from being forwarded, until the first packet is forwarded. Various methods known in the art may be used to identify packets that need to be blocked, including checking time stamps of packets belonging to a single stream and/or providing the packets of a single stream to packet steering unit 20 in a linked list.

Optionally, packets belonging to a single stream are handled and forwarded in the order they are received and if necessary a later received packet is blocked from being forwarded until the earlier received packet is forwarded. In some embodiments of the invention, before loading a packet into packet pool 48, it is verified that the packets currently in pool 48 do not belong to the same packet stream as the packet to be loaded, and if there is a packet in pool 48 that belongs to the same stream, the packet is skipped and a different packet is loaded into pool 48. Alternatively, when a packet is loaded into pool 48, if another packet in the pool belongs to the same stream, the loaded packet is blocked until the handling of the other packet is completed.

Assigning Lookup Parameters

Figure 6:
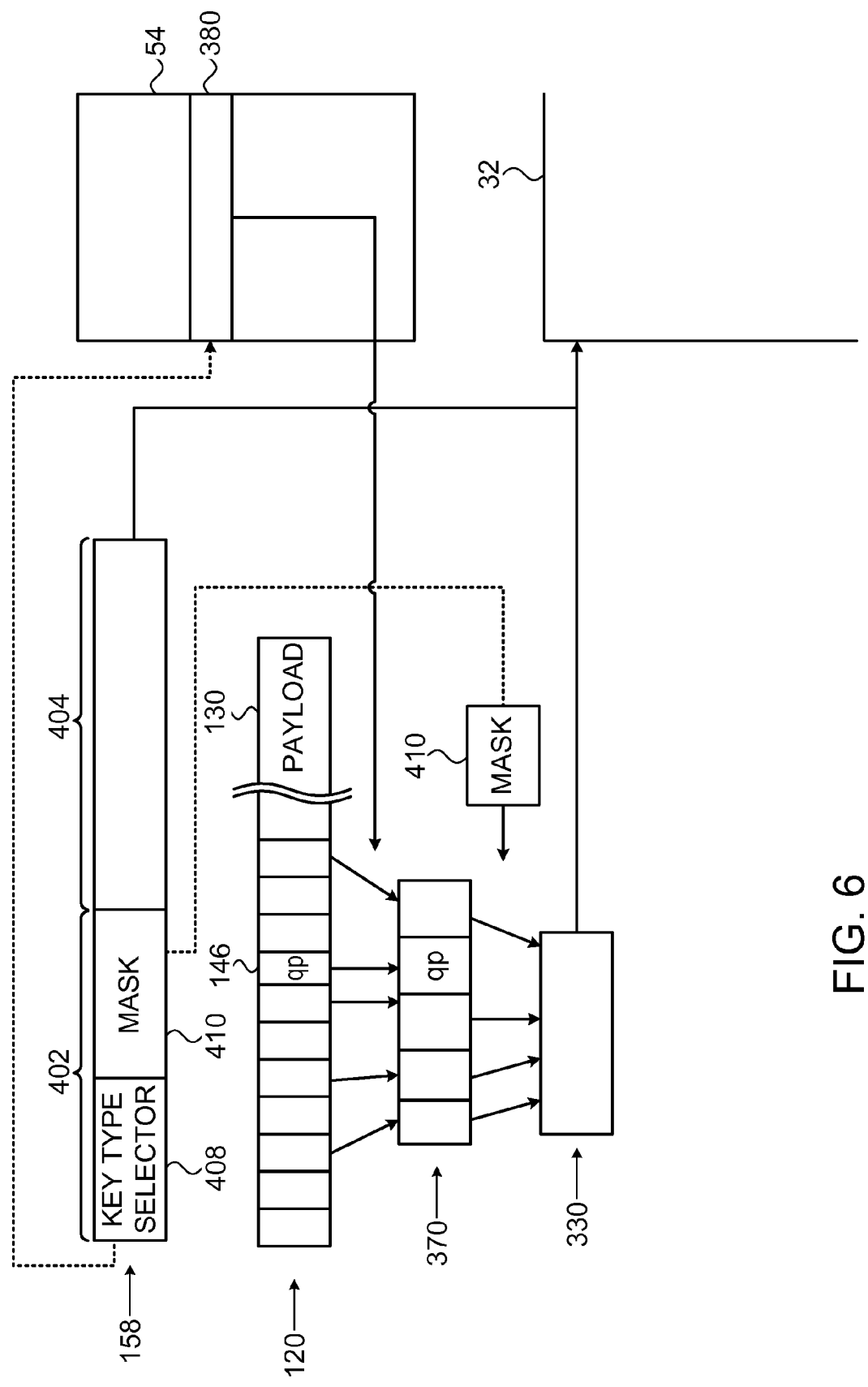
FIG. 6 is a schematic illustration of a set of steering table lookup parameters, and its use, in accordance with an embodiment of the invention.

FIG. 6 is a schematic illustration of a set of steering table lookup parameters 158, and its use, in accordance with an embodiment of the invention. Steering table lookup parameters 158 optionally include one or more packet parameters 402 which define the fields 140 of the packet 120 to be included in a parameter set 370 and/or in a lookup key 330 related to by engine 24 in a current stage. Steering table lookup parameters 158 optionally also include one or more table parameters 404 identifying the table 32 in which the lookup using the lookup key 330 is performed.

In some embodiments, all the fields 140 included in parameter set 370 identified by the one or more packet parameters 402 are used in generating (206) the lookup key 330. Alternatively, some of the fields 140 identified by the one or more packet parameters 402 are not used in generating the lookup key 330 but rather are used for other purposes. For example, a QP field 146 in the packet 120 may be used in forwarding the packet, without being included in generating the lookup key 330. In such embodiments, the packet parameters 402 optionally include a mask parameter 410 which indicates which of the packet fields 140 in parameter set 370 are used in generating (206) the lookup key 330.

Optionally, engine 24 manages a list 54 of predetermined sets of packet fields 140 for specific stages and packet types and the one or more packet parameters 402 include a pointer 408 to a specific entry 380 in list 54, which identifies a set 370 of packet fields 140. For example, list may include entries 380 for packets of different types (e.g., InfiniBand, Ethernet, IPv4, IPv6), for different protocol layers (e.g., layer 2, layer 3) and for extended headers, for cases in which a header may have various lengths.

In some embodiments, the one or more packet parameters 402 include an 8 bit pointer 408 to an entry 380 in list 54 and an 8-bit field-wise mask 410 which indicates for each of up to 8 fields in the parameter set 370, whether they are included in generating (206) the table lookup key 330.

EXAMPLES

Figure 7:
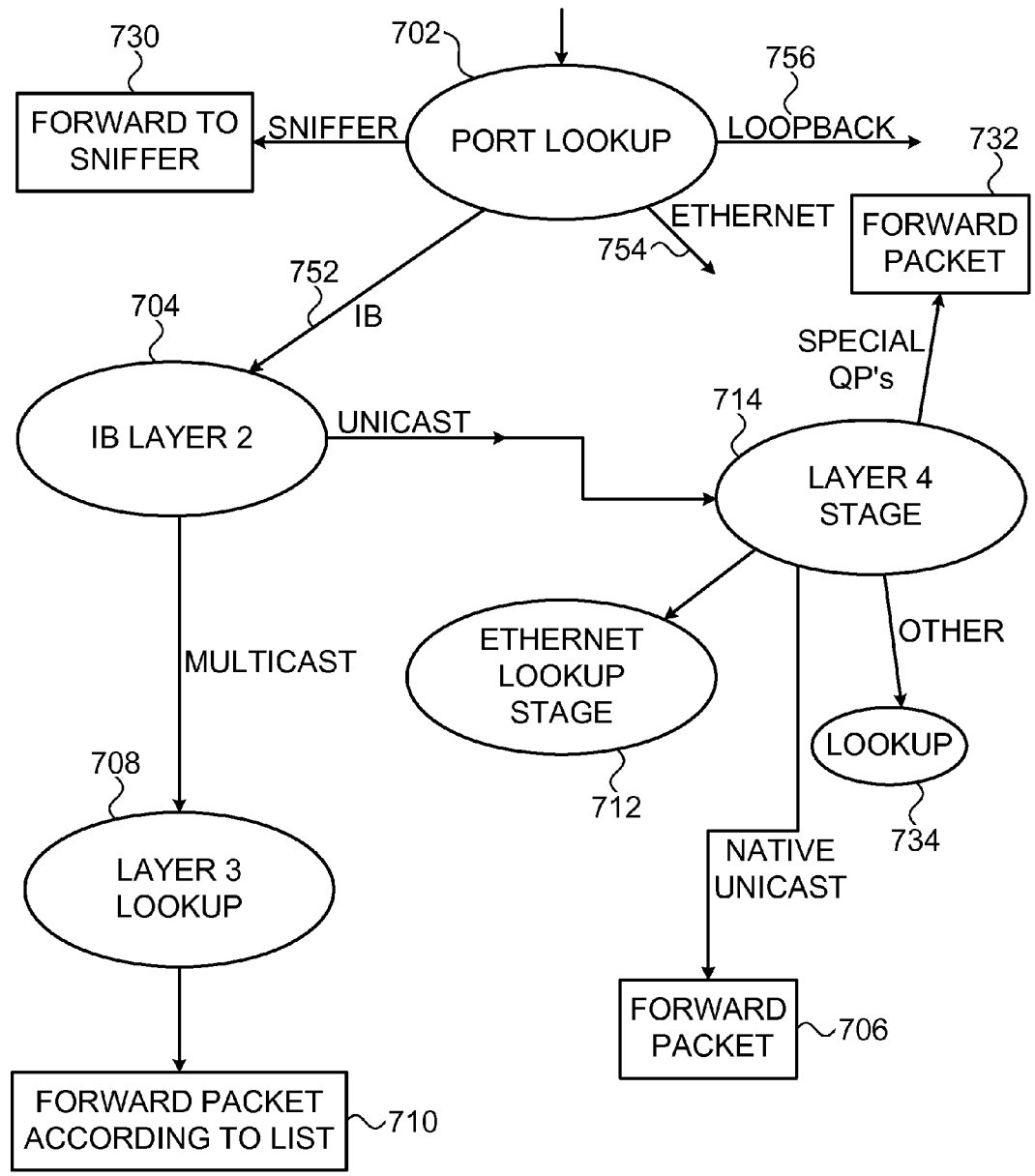
FIG. 7 is a flowchart of a tree of lookup stages which may be performed in handling packets, in accordance with a simplified embodiment of the invention.

FIG. 7 is a flowchart of a tree of lookup stages which may be performed in handling a packet 120, in accordance with a simplified embodiment of the invention. It will be noted that FIG. 7 presents only some of the options of handling a packet and does not attempt to present all the possible options. FIG. 7 illustrates a method carried out by a specific configuration of packet steering unit 20. It will be understood that packet steering unit 20 may be configured to perform many other steering methods, optionally without changing the hardware of packet steering unit 20.

In a first stage (702), a port lookup stage, engine 24 determines the port 22 (FIG. 1) through which the packet was received and accordingly assigns the packet a set 158 of steering table lookup parameters. The packet 120 is optionally kept in packet pool 48, along with an indication 156 that the packet was previously handled and the set 158 of parameters. In the example of FIG. 7, three possibilities are shown, corresponding to InfiniBand port 22A (arrow 752), Ethernet port 22B (arrow 754) and loopback port 22C (arrow 756). For each port 22, engine 24 assigns a different set 158 of parameters which are to be used in interpreting the packet 120 in a following handling stage. These parameters lead engine 24 along a desired path of the tree of FIG. 7.

In some embodiments of the invention, in the port lookup stage 702, engine 24 forwards 730 the packet to one or more sniffer destinations (e.g. VMM administrator or other administrator) if a sniffing option is enabled, in addition to selecting a next lookup stage. Alternatively, the sniffing may be performed in one or more later stages, for example if the sniffer is to receive only some of the packets.

In a second stage (704) used for packets 120 received on InfiniBand port 22A, engine 24 optionally includes in the lookup key a parameter which determines whether the packet is a multicast or unicast packet.

For multicast packets, the entry 300 optionally indicates that the packet is to be kept for another stage (708), in which the lookup key 330 is based on the destination layer-3 GID address of the packet. The corresponding entry 300 of stage 708 indicates the various vHCA-ID and QPs to which the packet is duplicated and forwarded (710). The packet may be forwarded to all its destinations in a single lookup stage, or in a plurality of lookup stages. For example, separate stages may be used for the destinations belonging to different virtual machines (VMs) and/or different vHCA-IDs. Each separate stage optionally uses a separate table 32, stored in a memory location associated with the destinations of the stage.

For unicast packets, the entry 300 retrieved in IB layer-2 stage 704 leads to a layer-4 lookup stage 714. The key in the layer-4 stage optionally includes parameters, such as the link next header (LNH) field, which indicate whether the packet includes an encapsulated packet, and whether the packet has a special QP (e.g., 0, 1).

For native unicast packets, the entry 300 of table 32 corresponding to the lookup key 330 optionally includes a vHCA-ID and an indication that the packet is to be forwarded (706) according to the vHCA-ID in the entry 300 and a QP field in the packet 120.

For encapsulated raw packets, a set 158 of steering table lookup parameters corresponding to the format of the encapsulated packet is stored for the packet in packet pool 48. The next lookup stage is performed according to the identified encapsulated format. This is illustrated by Ethernet lookup stage 712 and other lookup 734, which represents other possible encapsulated protocols, such as Fiber-Channel. The further acts of engine 24 for encapsulated packets are not illustrated by FIG. 7, as they will be understood by those skilled in the art.

Packets having special QPs are optionally handled by a separate table 32 and forwarded (732) according to the respective entry in this table. In some embodiments of the invention, for special QPs, engine 24 determines the VM 18 to which the packet is directed, and forwards the packet to a specific management QP of the specific VM 18. This ensures that management packets directed to computer 12 are directed to the intended VM 18, such that each VM interacts with NIC 60 as if the NIC is dedicated to the VM 18 (this is sometimes referred to as full virtual-IB-HCA service).

In some embodiments of the invention, in addition to determining the type of the packet and accordingly determining a next stage, engine 24 selects a table 32 to be used for the next stage, different packets being assigned different packets according to their protocol, destination VM 18 and/or destination core 12, for example.

In the example of FIG. 7, most packets are handled in three stages. Optionally, the port lookup is performed very fast and/or in parallel to other required tasks, such that its latency is substantially zero. The other stages optionally require 3-4 clock cycles, with each clock cycle being of, for example, between 4-5 nanoseconds. It is noted that other complicated packets may involve performing four, five or even more stages to examine all the relevant possibilities and have the packet forwarded to its correct destination. Using different numbers of stages for different packets allows fast handling of some packets while performing a more in-depth analysis of other packets.

In order to reduce latency, the tasks may be designed such that popular types of packets require fewer stages. For example, the parameters used to identify native unicast packets may be included in the key of the IB layer-2 lookup 704, such that native unicast packets, which in some systems are the majority of the packets handled, can be forwarded within only two stages.

In FIG. 7, a first stage is assigned to port lookup (702), such that the minimal number of stages of handling a packet is two. In other embodiments of the invention, the port lookup is performed together with the first lookup based on packet content, such that many packets, possibly even most packets, are handled in a single stage. In these embodiments, the set of default lookup parameters optionally includes in addition to the port through which the packet was received also the parameters required for forwarding simple packets, such as the QP of the packet, the LNH field of the packet and the destination address of the packet.

In some embodiments of the invention, engine 24 manages only a single set of default parameters for the first stage. In other embodiments, a plurality of different sets of default parameters are defined, for different packets, for example dependent on the port 22 through which the packet was received.

The maximal number of parameters related to in a single stage is optionally selected as a compromise between keeping the number low so that the stages are performed speedily and including as many parameters as possible to minimize the cases in which there is a need for more stages. In some embodiments, the maximal number of stages is set so that unicast packets that do not have special features, such as encapsulation, can be handled in a single stage. In some embodiments of the invention, in any specific stage, engine 24 does not relate to more than 16 or even not more than 8 fields 140.

In some embodiments of the invention, each stage examines parameters relating only to a single protocol layer. Alternatively, in one or more stages, the examined parameters belong to a plurality of protocol layers, for example belonging to a plurality of headers (132, 134, 136, 138).

For example, in some cases, special QP numbers are defined to indicate special destinations of packets. In some embodiments in accordance with such cases, rather than forwarding (406) the packet according to the vHCA-ID in the entry of table 32 and a QP field in the packet 120, the packet is kept for another stage. In the additional stage, engine 24 generates a lookup key 330 based on the QP field 146 and the entries for special QP values in table 32 direct packets having such special QP values to their destinations. For special QP numbers indicating the packet is an IP packet, engine 24 may perform an additional stage in which the lookup key is the IP 5-tuple of the packet.

The dividing of the handling of at least some packets into a plurality of stages allows for flexibility in load balancing the packets between cores 14 of computer 12. Optionally, when a single stream receives large amounts of traffic, table 32 is configured to distribute the packets between a plurality of cores 14, based on one or more fields 140, such as the IP source and/or destination, IP protocol and/or the TCP/UDP ports of the packet. The extra lookup stage or stages performed for the specific load balanced streams does not affect the latency of the handling of other streams which do not undergo such extra lookup stages.

The configuration of table 32 may be performed in advance, based on an expected load of the stream. Alternatively, hypervisor 36 may dynamically change the configuration of table 32 for a specific stream, according to its load and/or according to one or more attributes of the stream. In some embodiments of the invention, the table configuration is adjusted according to a quality of service (QoS) assigned to the stream, for example as indicated in one or more fields 140 of the packet, such as the DiffServ Code Point (DSCP) field in IP packets. For example, when a stream is identified as having a low load level all its packets may be forwarded by engine 24 in a single stage to a single destination. If the load of the stream passes a predetermined threshold, hypervisor 36 optionally reconfigures table 32 to add an additional stage to the forwarding of the stream, a stage in which the packets of the stream are distributed between destinations corresponding to different cores.

It is noted that the use of a dynamically adjusted number of stages allows forwarding packets directed to virtual machines 18 directly to the virtual machine rather than forwarding to a hosting physical machine which needs to use its resources to forward the packet to the correct virtual machine.

Figure 8:
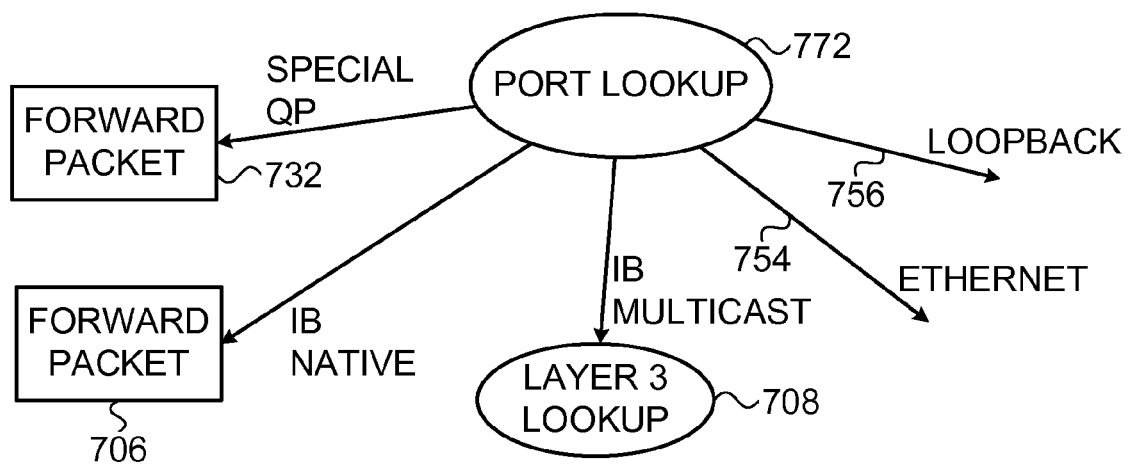
FIG. 8 is a flowchart of lookup stages performed in handling packets, in accordance with another embodiment of the invention.

FIG. 8 is a flowchart of lookup stages performed in handling packets, in accordance with another embodiment of the invention. The embodiment of FIG. 8 is designed for a system which does not support virtual machines 18 and encapsulated packets. In such a system, there are fewer options for handling packets and therefore tables 32 of packet steering unit 20 may be configured in a simpler manner allowing faster operation.

In the embodiment of FIG. 8, three parameters of the packet 120 are included in the lookup key 330:

1) the port through which the packet was received
2) whether the packet is a unicast or a multicast packet
3) the QP in the packet in order to determine whether the packet has a special QP.

In port lookup 772, if the reception port is an Ethernet port, steering table lookup parameters corresponding to Ethernet packets are assigned to the packet for an additional lookup stage. This is illustrated by arrow 754. A similar process is illustrated for loopback packets by arrow 756.

If the packet is identified as an InfiniBand multicast packet, steering table lookup parameters corresponding to multicast are stored in packet pool 48 for the packet, such that a multicast lookup stage 708 will be applied to the packet in a subsequent stage. Unicast packets identified as native are forwarded 706 with the QP from within the packet, while special QP packets are forwarded 732 with a QP from the entry in table 32.

When a multicast packet is directed to a plurality of VMs 18, an order of the VMs 18 is selected. A root table 32 which initially handles the packet is configured to have the next steering lookup stage of the packet to be performed with a table 32 corresponding to the first VM in the selected order. In the lookup corresponding to the first VM 18, the packet is optionally forwarded to all the addresses belonging to the multicast of the packet in the first VM and the packet is set for another lookup in a next VM 18 in the selected order. This is repeated until the packet is forwarded to its intended multicast addresses in all the relevant VMs. In some embodiments, for example when the multicast includes a large number of destinations on a single VM 18, more than one lookup stage is used for the addresses of a single VM. It is noted, however, that in some embodiments of the present invention, the entries 300 which identify the multicast destinations may be very large, such that a single lookup may be used in these embodiments for a large number of destinations, for example for all the multicast destinations of a single virtual HCA, a single VM 18 or even for multiple VMs 18.

In some embodiments of the invention, in one or more points along the tree of FIG. 7 or FIG. 8, the entry 300 may instruct engine 24 to stop its handling of the packet and to transfer the remaining steering tasks of the packet to a firmware and/or software process on NIC 60 and/or on computer 12. This may be used to handle errors, to handle rare cases for which it is not worthwhile to configure packet steering unit 22 and/or for any other reason. In some embodiments of the invention, the firmware and/or software process completes the handling of the packet such that the place of the packet in packet pool 48 is vacated for a new packet from queue 26. Alternatively, the firmware and/or software process may complete the handling of the packet or may return it to steering engine 24 for completion of its steering. In accordance with this alternative, the packet may remain in packet pool 48 in a blocked state, while the packet is handled by the firmware and/or software process. Optionally, if the firmware and/or software process is to return control of the steering of a packet to engine 24, the firmware inserts a set of steering parameters to the corresponding field 158 in packet pool 148 and removes the indication that the packet is blocked.

Hash Scheme

In some embodiments of the invention, lookup table 32 is accessed in accordance with a hash scheme. A hash function, such as CRC, XOR or any other suitable function, is applied to the lookup key 330, providing a table key. The table parameters 404 may include, for example, a base address (BA) of the table, an entry size (ES) of the entries of the table and a table size (TS) indicating a total size of the table. In an embodiment of the invention, the accessed entry (AE) is calculated as $$AE=BA+ES*(KEY \bmod TS)$$

wherein "mod" refers to the modulo operation.

The base address is optionally determined by software and/or firmware which manages the memory space used by computer system 10 for control structures. It may be stated as a single parameter, or may be formed of a plurality of partial base parameters which are added in the table access address calculation. In some embodiments, the base address is formed of a general Hosting base address for all the tables used or for all the tables used for a specific vHCA and a separate steering table base address, for the specific table. Alternatively the tables 32 are managed in a dedicated memory and managed by a separate memory management software or firmware.

Referring back to FIG. 4, table 32 comprises a structured area 832 and an extension area 855, for entries not fitting in structured area 832.

Each entry 300 of table 32 optionally comprises hash management fields 821 and entry fields 825. The hash management fields 821 optionally include a tag value field 838, a tag mask 834 and a pointer 836 to a next entry to be searched in case of a miss. In accessing an entry 300 to which the table key points, engine 24 determines whether the entry 300 is the intended entry for the packet by comparing the lookup key 330 as masked by the tag mask 834 of the entry 300 to the tag value field 838 of the entry. If the compared values match the entry 300 is the intended entry. Otherwise, the pointer 836 of the entry 300 is followed to a next entry 300, until a matching entry is found. Alternatively, other methods may be used to determine the next accessed entry, such as applying a different hash function or accessing following entries in structured area 832 in accordance with a predetermined order.

It is noted that the hash scheme described herein is brought by way of example and other hash schemes or non-hash schemes may be used in accessing entries of lookup table 32. For example, instead of each entry 300 having a separate pointer 836, each set of a predetermined number of entries 300 (e.g., 4 entries) is assigned a single pointer 836. Lookup key 330 accordingly points to a set of entries 300 and only if none of the tags 838 of the entries match the lookup key 330 does engine 24 follow the corresponding pointer 836.

In some embodiments of the invention, entries 300 have fixed lengths which allow accessing any specific entry 300 by calculating its offset from the beginning of the structured area 832. Optionally, in addition to entries 300 of structured area 832, table 32 includes an area 855 for defining entries 858 having variable lengths. Pointers 836 optionally direct to entries 858 in area 855. Optionally, when hypervisor 36 needs to define for a specific lookup key 330, an entry longer than provided by entries 300, the entry 300 corresponding to the lookup key 330 is purposely defined to not match the tags 838 of the entry 300 and the pointer 836 of the entry 300 is directed to an entry 858.

It is noted that table 32 may be formed of a plurality of sub-tables having separate base addresses (BA), as discussed above, or may be formed of a single table used for all entries.

Instead of having a separate queue 26 for packets not yet handled and a packet pool 48 for packets being handled, a single unit for both tasks may be used. Furthermore, in some embodiments, a plurality of queues 26 may be used, for example for different quality of service (QoS) levels.

It will be appreciated that the above described methods and apparatus are to be interpreted as including apparatus for carrying out the methods and methods of using the apparatus. It should be understood that features and/or steps described with respect to one embodiment may sometimes be used with other embodiments and that not all embodiments of the invention have all of the features and/or steps shown in a particular figure or described with respect to one of the specific embodiments. Tasks are not necessarily performed in the exact order described.

It is noted that some of the above described embodiments may include structure, acts or details of structures and acts that may not be essential to the invention and which are described as examples. Structure and acts described herein are replaceable by equivalents which perform the same function, even if the structure or acts are different, as known in the art. The embodiments described above are cited by way of example, and the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art. Therefore, the scope of the invention is limited only by the elements and limitations as used in the claims, wherein the terms "comprise," "include," "have" and their conjugates, shall mean, when used in the claims, "including but not necessarily limited to."

The invention claimed is:

1. A method of steering a packet, comprising:
   receiving a plurality of packets by a packet steering unit; and
   for each of the received packets:
   performing one or more initial steering lookup stages, each initial stage including a table lookup with a lookup key based on one or more packet specific attributes, the one or more initial steering lookup stages resulting in determining one or more fields of the packet, whose values for the received packet are to be used in a subsequent table lookup stage;

extracting, from the packet, specific values of the one or more fields determined in the one or more initial steering lookup stages;

generating a lookup key responsive to the extracted specific values;

determining a specific destination of the packet in a subsequent steering stage including a table lookup governed by the generated lookup key; and forwarding the packet to the specific destination determined based on the lookup key generated responsive to the values of the one or more fields determined in the one or more initial stages, such that different packets are forwarded to destinations determined based on values of different fields of the packet.

2. The method of claim 1, wherein the packet steering unit manages a plurality of different lookup tables and wherein performing the one or more initial steering lookup stages comprises determining, based on one or more packet specific attributes, a lookup table used in the subsequent stage, such that in determining the specific destination of the packet, different lookup tables are used for different packets.

3. The method of claim 2, wherein performing the one or more initial steering lookup stages comprises determining, based on one or more packet specific attributes, a structure of the lookup key to be used in accessing the lookup table in the subsequent steering stage.

4. The method of claim 1, wherein the one or more initial stages and the subsequent stage include together accessing a plurality of different lookup tables.

5. The method of claim 4, wherein the one or more initial and the subsequent stage include accessing a plurality of different lookup tables, each corresponding to a respective virtual machine on a computer serviced by the packet steering unit.

6. The method of claim 1, wherein the plurality of packets includes receiving InfiniBand unicast packets.

7. The method of claim 6, and comprising receiving a multicast packet and forwarding the multicast packet based on a lookup to one or more steering tables.

8. The method of claim 1, wherein the packet steering unit handles one or more other packets between at least some pairs of stages of handling a single packet.

9. The method of claim 1, wherein the subsequent steering stage includes a table lookup governed by the one or more fields determined in the one or more initial stages and packet specific attributes including information from within the packet.

10. The method of claim 1, wherein the handling of at least one of the packet includes forwarding the packet to at least one additional destination, based on information from one or more of the stages.

11. The method of claim 10, wherein forwarding the packet to the at least one additional destination comprises forwarding before the one or more subsequent stages.

12. The method of claim 10, wherein forwarding the packet to the at least one additional destination comprises forwarding to a plurality of destinations determined in a single stage.

13. The method of claim 1, wherein in each stage only fields from a single protocol-layer header are used in the lookup.

14. The method of claim 1, wherein determining the one or more fields and the specific destination of the packet include a first specific total number of stages for a first received packet, and a second specific total number of stages different from the first specific total number of stages, for a second received packet.

15. The method of claim 1, wherein determining the one or more fields and the specific destination of the packet include accessing a first specific total number of fields of the packet, for a first received packet, and a second specific total number of fields of the additional packet, different from the first specific total number of fields, for a second received packet.

16. The method of claim 1, wherein determining the one or more fields and the specific destination of the packet include accessing a specific set of fields of the packet, for a first received packet, and forwarding a second packet after accessing at least one field not included in the specific set.

17. The method of claim 1, wherein a destination of a first packet is selected responsively to values of one or more fields from a group including source Internet protocol (IP) address, destination IP address, User Datagram Protocol (UDP) port and transmission control protocol (TCP) port, and a destination of a second packet is selected without reference to the values in the fields of this group.

* * * * *